US012505937B2

(12) United States Patent
Iyonaga et al.

(10) Patent No.: US 12,505,937 B2
(45) Date of Patent: Dec. 23, 2025

(54) CABLE

(71) Applicant: DYDEN CORPORATION, Kurume (JP)

(72) Inventors: Yukihiro Iyonaga, Kurume (JP); Takahito Yajima, Kurume (JP); Shunsuke Maeda, Kurume (JP); Kazuhiko Nishimura, Kurume (JP); Daisuke Matsunaga, Kurume (JP)

(73) Assignee: DYDEN CORPORATION, Kurume (JP)

( * ) Notice: Subject to any disclaimer, the term of this patent is extended or adjusted under 35 U.S.C. 154(b) by 0 days.

(21) Appl. No.: 18/289,741

(22) PCT Filed: May 8, 2023

(86) PCT No.: PCT/JP2023/017331

§ 371 (c)(1),
(2) Date: Nov. 6, 2023

(87) PCT Pub. No.: WO2024/231988

PCT Pub. Date: Nov. 14, 2024

(65) Prior Publication Data

US 2025/0087384 A1 Mar. 13, 2025

(51) Int. Cl.
*H01B 7/06* (2006.01)
*H01B 7/18* (2006.01)

(52) U.S. Cl.
CPC ........... *H01B 7/065* (2013.01); *H01B 7/1825* (2013.01)

(58) Field of Classification Search
CPC ...... H01B 7/065; H01B 7/1825; H01B 7/189; H01B 7/0009; H01B 7/02; H01B 7/04;
(Continued)

(56) References Cited

U.S. PATENT DOCUMENTS 9,431,154 B1 * 8/2016 Scarpa .................. H01B 7/292
9,514,859 B1 * 12/2016 Scarpa .................. H01B 7/065
(Continued)

FOREIGN PATENT DOCUMENTS

JP S5676219 U 6/1981
JP 2011-034834 2/2011
(Continued)

OTHER PUBLICATIONS

KR Application No. 10-2024-7003192, Request for the submission of an opinion dated May 21, 2025.

*Primary Examiner* — Angel R Estrada
(74) *Attorney, Agent, or Firm* — Best Mode IP Law, PLLC; Yusuke Hirai

(57) ABSTRACT

Provided is a cable having improved durability while enabling smooth bending operation. A cable formed by covering a conductor section, in which a conductor is spirally disposed in a longitudinal direction, with an insulating covering member having an insulating property includes: a conductor section formed by stranding a plurality of bare wires to form a core wire and arranging a plurality of the core wires closely in contact in an annular shape; and a reinforcement section including a cord that includes a plurality of filaments of a fiber material, and formed by compressing and housing the cord substantially linearly within a central space formed by the core wires in the annular shape in the conductor section, and the cord is press-fitted into the central space.

8 Claims, 6 Drawing Sheets

(58) Field of Classification Search
CPC ... H01B 7/24; H01B 5/08; H01B 7/18; H01B 7/182
USPC ...... 174/69, 72 A, 110 R, 68.1, 120 R, 70 R, 174/77 R, 102 E
See application file for complete search history.

(56) References Cited

U.S. PATENT DOCUMENTS

| | | | | |
|---|---|---|---|---|
| 10,388,430 | B1 * | 8/2019 | Evans | G02B 6/4413 |
| 11,250,972 | B1 * | 2/2022 | Evans | H01B 9/005 |
| 12,047,749 | B2 * | 7/2024 | Schmidt | H04R 25/55 |

FOREIGN PATENT DOCUMENTS

| | | |
|---|---|---|
| JP | 2020119857 A | 8/2020 |
| KR | 2014-0019958 | 2/2014 |

* cited by examiner

[Fig.1]
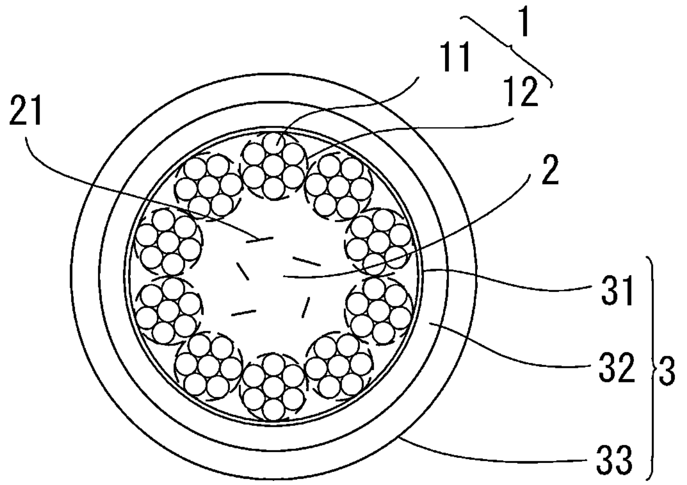
[Fig.2]
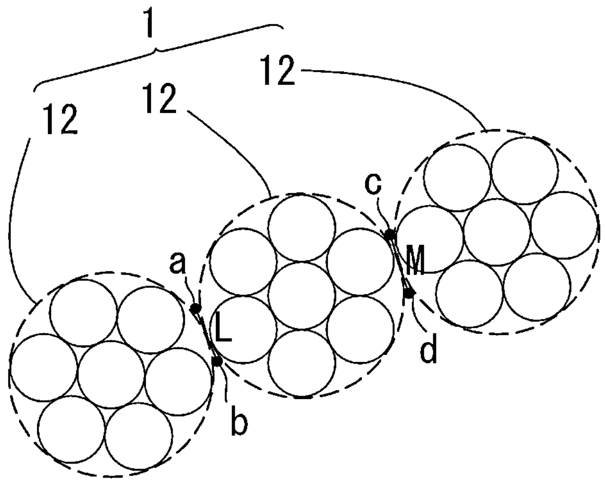

[Fig.3]
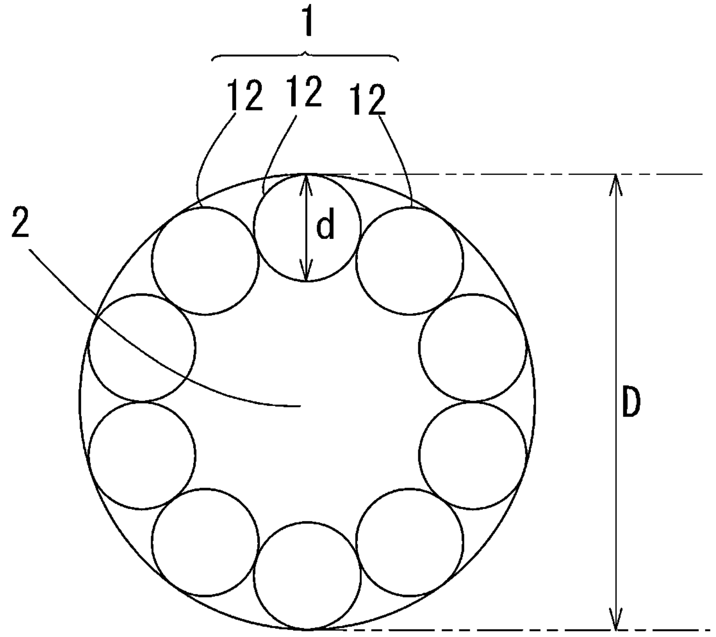
[Fig.4]
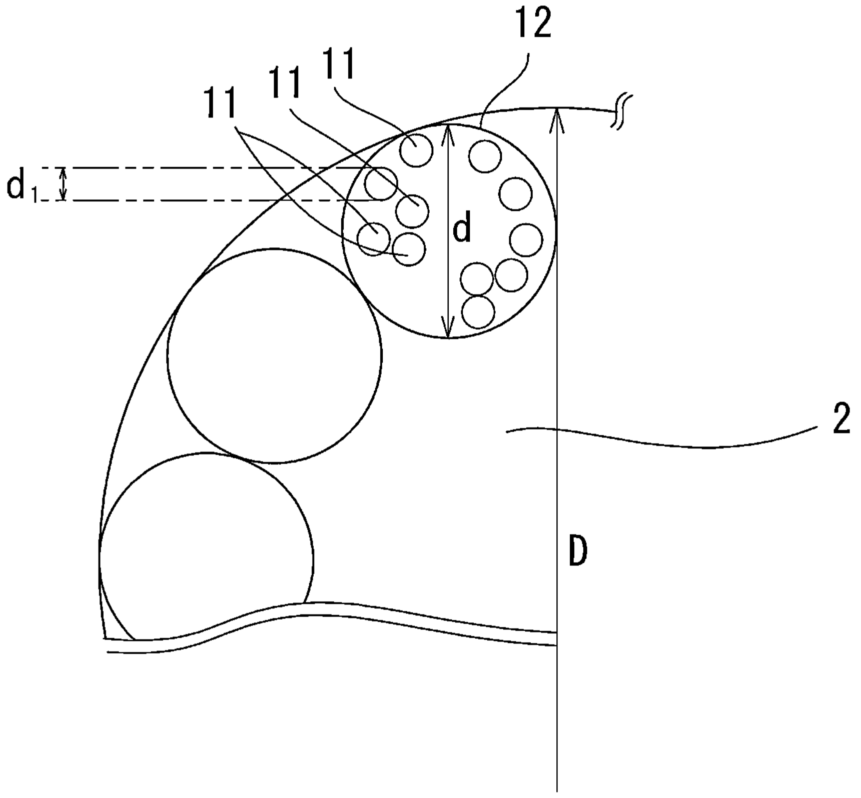

[Fig.5]
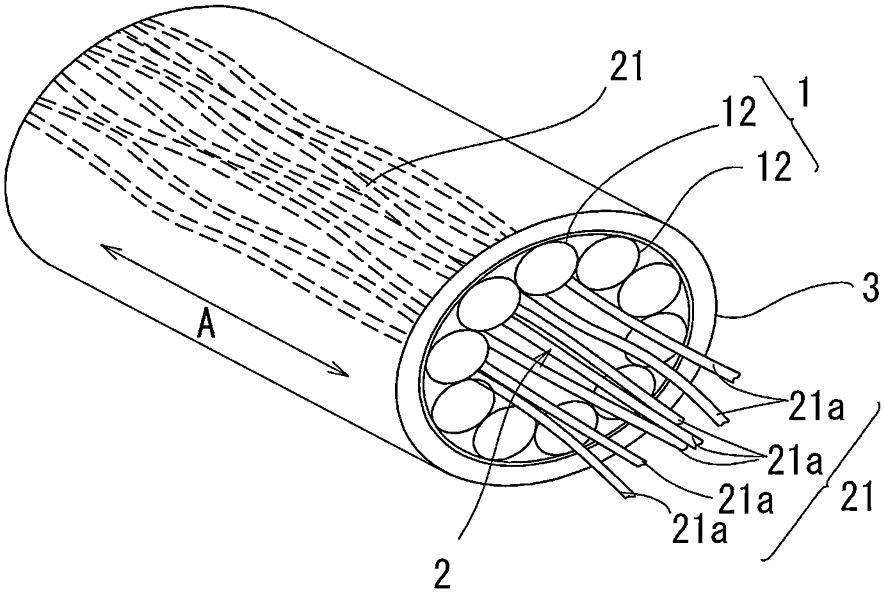

[Fig.6]
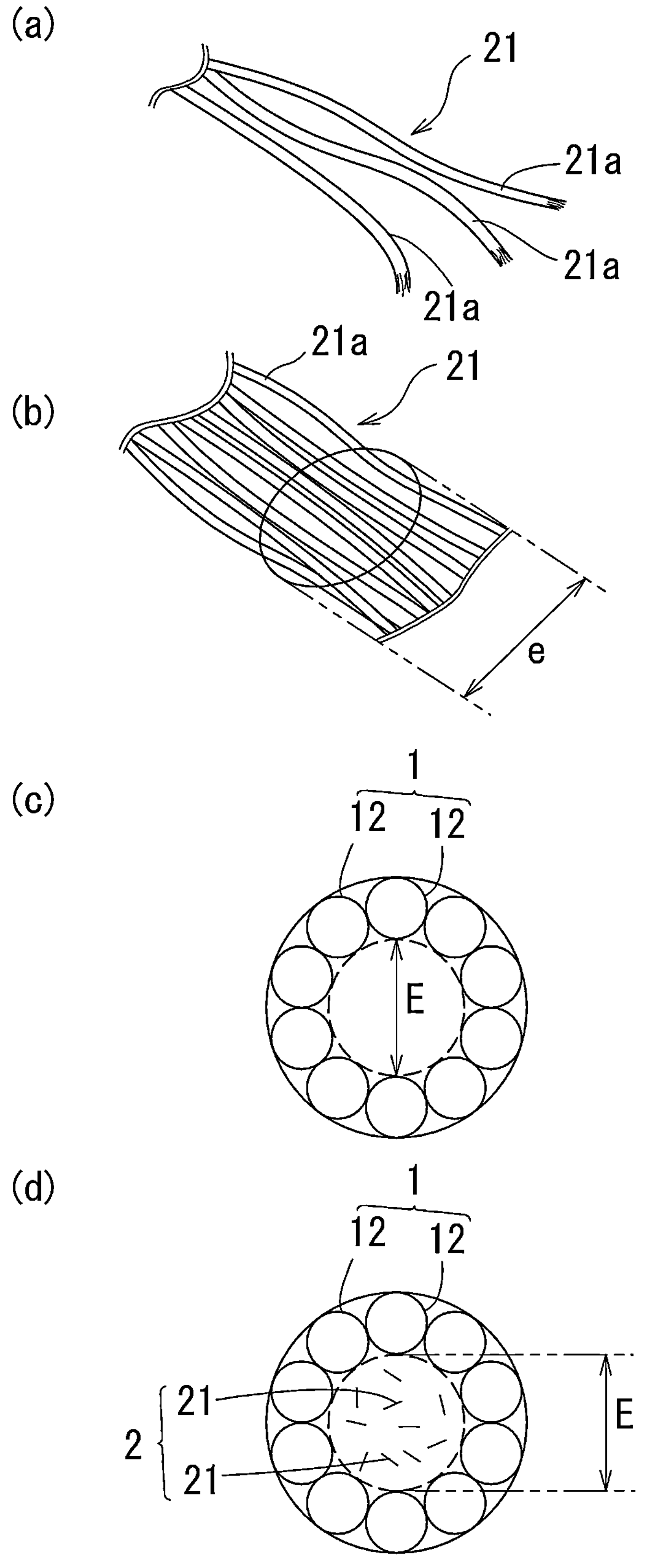

[Fig.7]
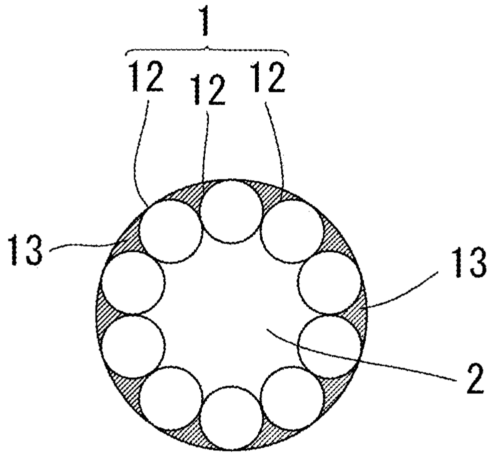
[Fig.8]
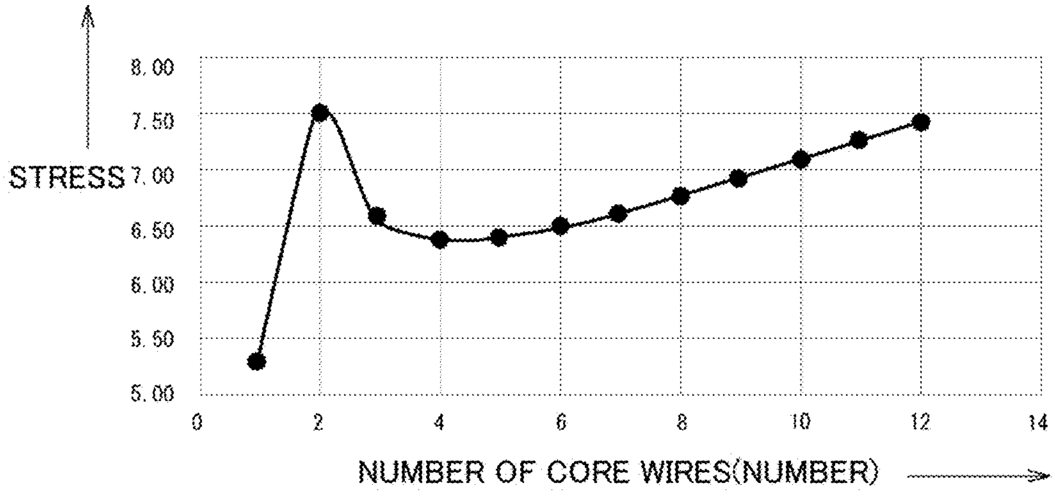

[Fig.9]
(a)
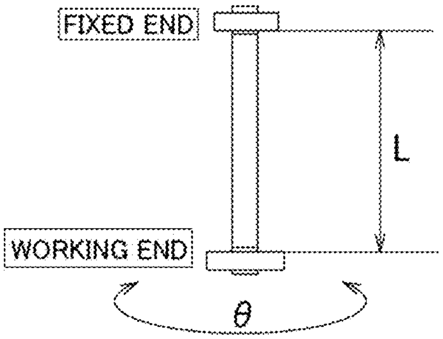
(b)
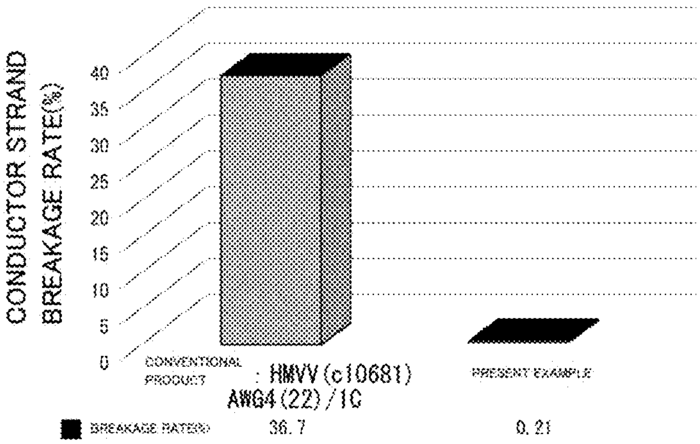
[Fig.10]
| ITEM | UNIT | CONVENTIONAL PRODUCT HMVV(c10681) 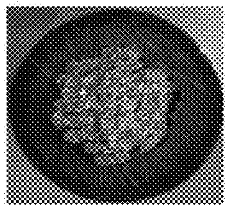 | PRESENT EXAMPLE 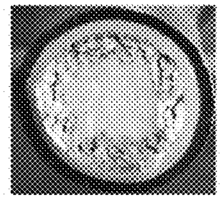 |
|---|---|---|---|
| TWISTING TEST<br>L=200mm<br>θ=±180°<br>5 MILLION TIMES | CONDUCTOR APPEARANCE | 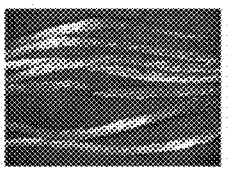 | 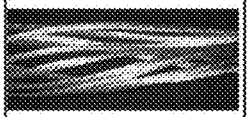 |
| | BREAKAGE RATE | 36.70% | 0.21% |

CABLE

TECHNICAL FIELD

The present invention relates to a cable formed of a plurality of conductors, and more particularly to a cable with improved durability.

BACKGROUND ART

In recent years, demand for cables with high wiring workability is increasing, including the development of the robotics industry. Such cables are often used as high-current power lines with large conductor sizes in applications such as sliding sections of transport robots and welding power cables, while also being used under repeated bending operations. Therefore, high durability against repeated bending operations over a long period of time has been required along with high flexibility.

From this viewpoint, to increase flexibility and durability, many conventional cables are formed with a structure in which a conductor rope-stranded in a concentric circular shape is covered with polyvinyl chloride (PVC) insulation or a PVC sheath so that the cross section of the cable has a circular shape.

As the conventional cable, for example, there is known a cable having a conductor with a plurality of child stranded conductors parent-stranded in a single-layer stranded structure, and in the configuration of the cross section of the conductor cut along a direction perpendicular to its length direction, a gap is formed in the center of the plurality of child stranded conductors, and a replenishing member is stranded between each of the child stranded conductors (cf. Patent Literature 1).

Further, as the conventional cable, for example, there is known a cable in which a plurality of insulated wire cores each formed by coating a conductor with rubber or vinyl are stranded together with an intervening jute inserted in a gap of the insulated wire cores, and rubber or a plastic sheath is applied to the outer circumference of the insulated wire cores (cf. Patent Literature 2).

CITATION LIST

Patent Literature

[Patent Literature 1] Japanese Patent Laid-Open No. 2020-119857

[Patent Literature 2] Japanese Utility Model Laid-Open No. 56-76219

SUMMARY OF INVENTION

Technical Problem

For example, a cable with a gap formed in a central portion of a plurality of child stranded conductors, as described in Patent Literature 1 above, has a problem with low durability due to the tendency of the overall shape of the cable to collapse from the gap in the central portion at the time of cable operation, which easily induces damage to the child stranded conductors. Further, a cable formed of a plurality of individually coated insulated wire cores, as described in Patent Literature 2 above, has a problem that it is difficult to obtain a sufficiently large current from the generated current, which is indicated by the sum of the plurality of individually independent insulated wire cores.

Additionally, such a cable formed of a plurality of insulated wire cores has problems with a larger outer diameter and increased manufacturing cost caused by splitting of the inner conductor and insulation and taping of the split conductors.

A cable using PVC insulation or a PVC sheath, such as a cable provided with rubber or a plastic sheath, as described in Patent Literature 2, has a problem with low durability due to low rubber elasticity causing local generation of stress during the twisting or bending operation of the cable, which easily leads to damage.

That is, the conventional cable is required to have thick conductors when used as a high-current power line. However, when the cable is bent or twisted, the thick conductors move inside the insulation, and the conductors interfere with each other and are damaged, resulting in a problem with low durability.

The present invention has been made in order to solve the problems described above, and it is an object of the present invention to provide a cable having improved durability while enabling smooth bending operation.

Solution to Problem

As a result of extensive studies, the inventors of the present invention have devised an arrangement structure and found a cable with improved durability, bringing the present invention to completion.

Therefore, a cable disclosed in the present application is a cable formed by covering a conductor section, in which a conductor is spirally disposed in a longitudinal direction, with an insulating covering member that has an insulating property, the cable including: a conductor section formed by stranding a plurality of bare wires to form a core wire and arranging a plurality of the core wires closely in contact in an annular shape; and a reinforcement section including a cord that includes a plurality of filaments of a fiber material, and formed by compressing and housing the cord substantially linearly within a central space formed by the core wires in the annular shape in the conductor section, and the cord is press-fitted into the central space.

As described above, the cable disclosed in the present application is a cable formed by covering a conductor section, in which a conductor is spirally disposed in a longitudinal direction, with an insulating covering member that has an insulating property, the cable including: a conductor section formed by stranding a plurality of bare wires to form a core wire and arranging a plurality of the core wires closely in contact in an annular shape; and a reinforcement section including a cord that includes a plurality of filaments of a fiber material, and formed by compressing and housing the cord substantially linearly within a central space formed by the core wires in the annular shape in the conductor section, and the cord is press-fitted into the central space. Accordingly, with the cord press-fitted into the central portion of the cable, the cord is packed in the central portion in a volume exceeding a theoretically calculated cross-sectional area, leading to reduced contact pressure between the bare wires, and the cord with cushioning properties in the central portion supports the cable by force from the central portion of the cable toward the outer circumference of the cable in a radiating direction. This significantly improves cable durability in twisting operation performed by a welding robot or the like, for example, thereby enabling a reduction in the occurrence of cable breakage. Further, due to the configuration of the child stranded wires using bare wires that are not isolated from each other by an insulation member or tape, high processability can be obtained, making easy joining at terminal portions. This facilitates handling and enables a reduction in manufacturing cost compared to the conventional technology that requires peeling of coated wires of a plurality of child stranded wires for joining at terminal portions.

In the cable disclosed in the present application, if necessary, the cross-sectional area of the cord in a natural placement is formed to be bulkier than the cross-sectional area of the central space. Since the cross-sectional area of the cord in the natural placement is formed to be bulkier than the cross-sectional area of the central space as described above, the cord as an intervention is press-fitted into the central portion in a highly compressed state. This results in the formation of the cable with the cord maintained in a highly flexible state, enabling an improvement in cushioning properties of the cord and a further improvement in cable durability.

In the cable disclosed in the present application, if necessary, the cord is made of synthetic fiber. Since the cord is made of synthetic fiber as described above, the cord made of highly flexible synthetic fiber is press-fitted into the central portion of the cable, and the cord is packed in the central portion in a volume further exceeding the theoretically calculated cross-sectional area, thereby leading to reduced contact pressure between the bare wires, and the cord made of synthetic fiber with cushioning properties in the central portion supports the cable by force from the central portion of the cable toward the outer circumference of the cable in the radiating direction. This results in the formation of the cable with the cord reliably maintained in a soft state, enabling a further improvement in cable durability.

In the cable disclosed in the present application, if necessary, the reinforcement section houses the cord having fewer spiral rounds within the central space than spiral rounds of the conductor section. Since the reinforcement section houses the cord having fewer spiral rounds within the central space than spiral rounds of the conductor section as described above, the cord made of synthetic fiber and serving as an intervention is press-fitted into the central portion in a state close to straight insertion in which a highly linear state is maintained. This results in the formation of the cable with the cord maintained in a soft state, enabling a further improvement in the cushioning properties of the cord and a further improvement in the cable durability.

In the cable disclosed in the present application, if necessary, the core wires are linearly and closely in contact with each other at a plurality of points. Since the core wires are linearly and closely in contact with each other at a plurality of points as described above, the bare wires are in contact with each other with a larger surface area, and the occurrence of heat generation and voltage drop in the event of damage to the cable is mitigated, enabling a further improvement in safety.

In the cable disclosed in the present application, if necessary, the diameter of the conductor section is 3 to 6 times the diameter of the core wire. Since the diameter of the conductor section is 3 to 6 times the diameter of the core wire as described above, the ratio of the diameter of the core wire to the diameter of the conductor section is optimized, which can reduce stress and interference between the bare wires due to the twisting operation, optimally enhancing durability with the core wire filled to an optimal degree.

In the cable disclosed in the present application, if necessary, the diameter of the core wire is 8 to 60 times the diameter of each of the bare wires. Since the diameter of the core wire is 8 to 60 times the diameter of the bare wire as described above, the ratio of the diameter of the core wire to the conductor diameter of the bare wire is optimized, which can reduce the occurrence of stress due to the twisting operation, optimally enhancing durability with the bare wire filled to an optimal degree.

In the cable disclosed in the present application, if necessary, a gap is formed in a region formed between the conductor sections adjacent to each other and the insulating covering member. Since a gap is formed in a region formed between the adjacent conductor sections and the insulating covering member as described above, the gap acts as a cushion when the cable is used with repeated operations, such as twisting operations in a welding robot or the like. This can significantly improve the cable durability and reduce the occurrence of breakage, as well as eliminating the need for a cutting process of a member in the region, thereby leading to improved processability and reduced manufacturing cost.

In the cable disclosed in the present application, if necessary, the conductor section includes 6 to 15 of the core wires. Since the conductor section including 6 to 15 of the core wires as described above, the ratio of the core wire to the conductor section is optimized, which can reduce stress and interference between the bare wires due to the twisting operation, optimally enhancing durability with the core wire filled to an optimal degree.

BRIEF DESCRIPTION OF DRAWINGS

FIG. 1 is a configuration diagram of a cable according to a first embodiment of the present invention.

FIG. 2 is an explanatory view for explaining a relationship between adjacent core wires in the cable according to the first embodiment of the present invention.

FIG. 3 is an explanatory view for explaining a diameter of a conductor section and a diameter of a core wire of the cable according to the first embodiment of the present invention.

FIG. 4 is an explanatory view for explaining the diameter of the core wire and a diameter of a bare wire of the cable according to the first embodiment of the present invention.

FIG. 5 is an explanatory diagram for explaining the configuration of the cable according to the first embodiment of the present invention.

FIG. 6 is an explanatory view for explaining press-fitting of a cord in the cable according to the first embodiment of the present invention.

FIG. 7 is a configuration diagram of a cable according to a second embodiment of the present invention.

FIG. 8 illustrates calculation results of an outer diameter of a cable in accordance with the number of core wires in the cable according to Example 1 of the present invention.

FIG. 9 illustrates measurement results of a cable twisting test according to Example 2 of the present invention.

FIG. 10 illustrates a result of each cable appearance (conductor appearance) in the cable twisting test according to Example 2 of the present invention.

DESCRIPTION OF EMBODIMENT

First Embodiment

As illustrated in FIG. 1, a cable according to a first embodiment is a cable formed by covering a conductor section 1, in which a conductor is spirally disposed in a longitudinal direction, with an insulating covering member 3 that has an insulating property, the cable including: the conductor section 1 formed by stranding a plurality of bare wires 11 to form a core wire 12 and arranging a plurality of the core wires 12 closely in contact in an annular shape; and a reinforcement section 2 that includes a cord 21 including a plurality of filaments 21*a* of a fiber material, and is formed by compressing and housing the cord 21 substantially linearly within a central space formed by the core wires 12 in the annular shape in the conductor section 1, and the cord 21 is press-fitted into the central space.

The conductor section 1 is formed by arranging the core wires 12 in a spiral shape. That is, the conductor section 1 is formed by stranding the core wire 12 along the longitudinal direction.

The core wire 12 is formed by stranding a plurality of the bare wires 11. That is, the core wire 12 can be formed as a composite stranded conductor. The stranding method is not particularly limited but may be rope stranding or collective stranding. The correlation between the conductor stranding direction (conductor parent stranding direction) and the collection direction is not particularly limited, but these directions are preferably the same, which can exhibit higher durability than a case where the stranding direction is a different direction.

The outer diameter of the conductor section 1 is preferably equal to or more than 0.85 times a theoretically calculated value (i.e., not equal to or not less than "−15% of the theoretical outer diameter value"), and may be, for example, about 0.85 to 0.98 times the theoretically calculated value. When the bare wires 11 in the conductor section 1 partially contact each other and flatten, the outer diameter of the conductor section 1 decreases. When the outer diameter of the theoretically calculated value of the conductor section 1 becomes excessively smaller than 0.85 times, the contact pressure becomes large, and the durability decreases.

The conductor section 1 is not particularly limited as long as the conductor section 1 has a structure in which the core wires 12 are arranged in a concentric circular shape, but preferably has a structure in which the core wires 12 are stranded and arranged in a single layer.

The material of the bare wire 11 is not particularly limited, but for example, a copper wire can be used. From the viewpoint of excellent durability, a metal-plated copper wire can be used. A soft copper wire, which has a smooth surface and is a soft electrical copper wire, can be used, and in this case, high flexibility and conductivity can be obtained compared to the case of a hard copper wire, which is hard. In this regard, for example, a tin-plated soft copper wire can be used as the conductor constituting the bare wire 11, leading to improved corrosion resistance of the conductor surface.

The conductor section 1 is formed by arranging the plurality of core wires 12 closely in contact in an annular shape. With the shape of the plurality of core wires 12 closely in contact, adjacent core wires 12 have electrical contacts with each other, and the core wires 12 arranged on the circular ring function as a single bundle of conductors, so that a large current can be easily obtained, and electrical safety can be improved. Additionally, from the viewpoint of adjacent core wires 12 having electrical contacts with each other, it is possible to easily comply with equipment safety standards.

More preferably, as illustrated in FIG. 2, the adjacent core wires 12 are in contact with each other at a plurality of points a and b, and are in contact with each other closely and linearly along a straight line L formed by the plurality of points a and b. Similarly, as illustrated in FIG. 2, adjacent core wires 12 are in contact with each other at a plurality of points c and d, and are in contact closely and linearly along a straight line M formed by the plurality of points c and d. That is, in appearance, from a macroscopic viewpoint, the adjacent core wires 12 are in so-called surface contact with each other.

Since the core wires 12 are linearly and closely in contact with each other at a plurality of points as described above, the core wires 12 are in contact with each other with a larger surface area, and the occurrence of heat generation and voltage drop in the event of damage to the cable is mitigated, enabling a further improvement in safety. In addition, not isolating the core wire 12 with another insulating member, taping, or the like leads to improved durability and good processability, thus also allowing for an improvement in electrical safety.

As illustrated in FIG. 3, although the correlation between a diameter D of the conductor section 1 and a diameter d of the core wire 12 is not particularly limited, the diameter D of the conductor section 1 is preferably 3 to 6 times the diameter d of the core wire 12 (including both end values of 3 and 6; the same applies hereinafter).

In other words, the diameter ratio D/d is preferably 3 to 6, and more preferably, the ratio D/d is 3.5 to 5.

When the diameter ratio D/d is smaller than 3, interference between the core wires 12 may be excessively large. On the other hand, when the diameter ratio D/d is larger than 6, the stranded outer diameter of the core wire 12 becomes large, which easily causes an increase in manufacturing cost and an increase in the outer diameter.

When the core wires 12 are stranded in two layers, the core wires 12 in the first and second layers interfere with each other, reducing durability. Therefore, the core wire 12 preferably has a single-layer structure and a diameter ratio D/d of 3 to 6.

Since the diameter of the conductor section 1 is 3 to 6 times the diameter of the core wire 12 as described above, the ratio of the diameter of the core wire 12 to the diameter of the conductor section 1 is optimized, which can reduce stress and interference between the bare wires 11 due to the twisting operation, optimally enhancing durability with the core wire 12 filled to an optimal degree.

As illustrated in FIG. 4, although the correlation between the diameter d of the core wire 12 and a diameter $d_1$ of the bare wire 11 constituting the core wire 12 is not particularly limited, the diameter d of the core wire 12 is preferably 8 to 60 times the diameter $d_1$ of the bare wire 11. That is, the diameter ratio $d/d_1$ is preferably 8 to 60 (including both end values 8 and 60; the same applies hereinafter).

For example, the diameter ratio $d/d_1$ falls within the range of 8 to 60, whether calculated by collective stranding or by seven stranding, based on the results of calculation under the conditions that the total cross-sectional area of the cable is 8 to 55 sq mm, the number of core wires 12 is 6 to 15, and the diameter of the strand (bare wire 11) is 0.08 to 0.12 mm.

For example, when the seven stranding was performed on the strands (bare wires 11), the diameter ratio $d/d_1$ was calculated to be 9 under the conditions that the total cross-sectional area of the cable was 8 sq mm, the number of core wires 12 was 15, and the diameter of the strand (bare wire 11) was 0.12 mm. Further, when the same seven stranding was performed, the diameter ratio $d/d_1$ was calculated to be 56, for example, under the conditions that the total cross-sectional area of the cable was 55 sq mm, the number of core wires 12 was 6, and the diameter of the strand (bare wire 11) was 0.08 mm.

For example, when the collective stranding was performed on the strands (bare wires 11), the diameter ratio $d/d_1$ was calculated to be 8 under the conditions that the total cross-sectional area of the cable was 8 sq mm, the number of core wires 12 was 15, and the diameter of the strand (bare wire 11) was 0.12 mm. Further, when the same collective stranding was performed, the diameter ratio $d/d_1$ was calculated to be 49, for example, under the conditions that the total cross-sectional area of the cable was 55 sq mm, the number of core wires 12 was 6, and the diameter of the strand (bare wire 11) was 0.08 mm.

Since the diameter of the core wire 12 is 8 to 60 times the diameter of the bare wire 11 as described above, the ratio of the diameter of the core wire 12 to the conductor diameter of the bare wire 11 is optimized, which can reduce the occurrence of stress due to the twisting operation, optimally enhancing durability with the bare wire 11 filled to an optimal degree.

The number of core wires 12 is not particularly limited, but is preferably 6 to 15 (including both end values 6 and 15; the same applies hereinafter) and more preferably 8 to 12. For example, the number can be 10, increasing stranding durability.

The reason for this is that when the number of these core wires 12 is less than 6, durability decreases, and when the number is more than 15, the outer diameter and the manufacturing cost increase. When the core wires 12 are stranded in two layers to avoid an increase in the outer diameter, the core wires 12 in the first and second layers that constitute the double-layer stranding interfere with each other, reducing the durability.

Since the conductor section 1 is formed of 6 to 15 core wires 12 as described above, the ratio of the core wire 12 to the conductor section 1 is optimized, which can reduce stress and interference between the bare wires 11 due to the twisting operation, optimally enhancing durability with the core wire 12 filled to an optimal degree.

As illustrated in FIG. 5, in the reinforcement section 2, the cord 21 is compressed and housed substantially linearly along a linear direction A within the central space formed by the annular core wire 12 of the conductor section 1. That is, this is a configuration in which the cord 21 is press-fitted into the central space. The press-fit is a state in which pressure is applied for insertion.

As illustrated in FIG. 5, the cord 21 being substantially linear means that the cord 21 is housed within the central space in a shape along the linear direction A, which is the traveling direction (longitudinal direction) of the cable, and maintains a substantially linear shape.

For example, even when the cord 21 is partially or locally bent to some extent, as illustrated in FIG. 5, this is included in the state of the cord 21 being substantially linear as long as the overall shape is along the linear direction A and can be said to be linear.

More preferably, the cord 21 having fewer spiral rounds is housed within the central space than spiral rounds of the conductor section 1. That is, in contrast to the bare wire 11 in a spirally stranded state, the cord 21 as an intervention is formed in a straight state close to a state of not being stranded.

As a result, the cord 21 as an intervention is press-fitted into the central portion in a state close to straight insertion, maintaining a linear state with high straightness. This results in the formation of the cable with the cord 21 maintained in a soft state instead of a stranded and hard state, thereby enabling a further improvement in the cushioning properties of the cord 21 and a further improvement in the durability of the cable.

The cord 21 is formed of a plurality of filaments 21*a* of a fiber material. For example, as illustrated in FIG. 6(*a*), the cord 21 can be formed of a plurality of stranded filaments 21*a*.

The cord 21 is preferably configured to have a diameter e of the cross section in the natural placement, illustrated in FIG. 6(*b*), larger than a diameter E of the cross section of the central space formed closer to the center of the cable than the conductor section 1, illustrated in FIG. 6(*c*).

Thus, as illustrated in FIG. 6(*d*), the cross-sectional area of the cord 21 constituting the reinforcement section 2 in the natural placement is configured to be larger than the cross-sectional area of the central space of the cable, and to be bulkier than the cross-sectional area of the central space. In this way, the cord 21 as an intervention is press-fitted into the central portion in a highly compressed state, which results in the formation of the cable with the cord 21 maintained in a highly flexible state, enabling an improvement in cushioning properties of the cord 21 and a further improvement in cable durability.

The cord 21 is not particularly limited as long as the cord 21 is made of a fiber material, and can be made of a natural material, but is preferably made of synthetic fiber from the viewpoint of uniform quality and cost.

The examples of the synthetic fiber include, but not particularly limited to, polyester resins, acrylic resins, rubber resins, vinyl alkyl ether resins, silicone resins, polyamide resins, urethane resins, fluorine resins, and epoxy resins. From the viewpoint of easy handling, polyester is preferably used, polyester is more preferably used, and cotton-like polyester is still more preferably used. For example, a polyester non-woven fabric can be used as third filaments 21*a*, which are stranded into a three-strand braid, and a plurality of the three-strand braids can be used for the cord 21 as an intervention.

Since the cord 21 is made of synthetic fiber as described above, the cord 21 made of highly flexible synthetic fiber is press-fitted into the central portion of the cable, and the cord 21 is packed in the central portion in a volume further exceeding the theoretically calculated cross-sectional area, thereby leading to reduced contact pressure between the bare wires 11, and the cord 21 made of synthetic fiber with cushioning properties in the central portion supports the cable by force from the central portion of the cable toward the outer circumference of the cable in the radiating direction. This results in the formation of the cable with the cord 21 reliably maintained in a soft state, enabling a further improvement in cable durability.

The insulating covering member 3 for covering the conductor section 1 is not particularly limited as long as the insulating covering member 3 is an insulating member. For example, the insulating covering member 3 can be formed of a plurality of members: a holding tape 31 that covers the outer circumference of the conductor section 1 and holds and fixes the conductor section 1 in a tape shape; an insulating member 32 that covers the outer circumference of the holding tape 31; and a sheath 33 that covers the outer circumference of the insulating member 32 and prevents damage to the cable.

The material of the holding tape 31 is not particularly limited, but for example, a fluoroplastic tape can be used. Examples of such fluoroplastic include various materials such as tetrafluoroethylene/perfluoroalkyl vinyl ether copolymer (PFA), tetrafluoroethylene/hexafluoropropylene copolymer (FEP), tetrafluoroethylene/ethylene copolymer (ETFE), polyvinylidene difluoride (PVDF), polychlorotrifluoroethylene (PCTFE), chlorotrifluoroethylene/ethylene copolymer (ECTFE), and polytetrafluoroethylene (PTFE). The use of such a tape prevents restraints of the conductor section 1 inside the cable due to the characteristics of high slipperiness, high stretchability, and flexibility, enabling a further improvement in durability.

The insulating member 32 is preferably made of a material with higher bending elasticity than the material of the sheath 33.

The material of the insulating member 32 is not particularly limited as long as the insulating member 32 is an insulating member, but various resins such as an ester-based thermoplastic elastomer (TPEE), an olefin-based thermoplastic elastomer (TPO), a urethane-based thermoplastic elastomer (TPU), and an amide-based thermoplastic elastomer (TPAE) can be used. More specifically, for example, polyester (PEs), polybutylene terephthalate (PBT), polyethylene (PE), polypropylene (PP), polyamide 6 (PA6), polyamide 11 (PA11), polyamide 12 (PA12), polyethylene terephthalate (PET), polybutylene naphthalate (PBN), polyvinylidene fluoride (PVDF), ethylene-tetrafluoroethylene copolymer (ETFE), polytetrafluoroethylene (PTFE), polyphenylene sulfide (PPS), polyether ether ketone (PEEK), ethylene vinyl alcohol copolymer (EVOH), acrylonitrile butadiene styrene (ABS), ethylene vinyl alcohol (EVA), or polyimide (PI) can be used.

For example, polyester elastomer can be used as the insulating member 32, and in this case, polyester has higher bending elasticity than PVC, and due to its hardness property, it is possible to prevent twisting stress from being concentrated on the terminal portion. In addition, the insulating member 32 can be formed through pipe extrusion, so that durability can be maintained without restrictions on the conductor, reducing stress on the core wire 12 during cable manufacturing and resulting in the manufacturing of a high-quality cable.

The rigidity of the insulating member 32 is not particularly limited, but from the viewpoint of enhancing durability, the insulating member 32 preferably has a rigidity of 50 Mpa to 400 Mpa, and more preferably has a rigidity of 70 Mpa to 300 Mpa. In this regard, it is preferable to select the insulating member 32 of a grade that can withstand 10 million times of bending even at a bending radius of 6D (mm).

The material of the sheath 33 is not particularly limited, but examples thereof include polyvinyl chloride (PVC), polyethylene (PE), and fluorinated ethylene propylene (FEP) (Teflon, registered trademark). For easy handling, it is possible to use polyvinyl chloride (PVC) that is flexible, has a track record in welding robot cables, and is flame-retardant and oil-resistant.

In this way, the cord 21 is press-fitted into the central portion of the cable, and the cord 21 is packed in a housing volume exceeding the theoretically calculated cross-sectional area, leading to reduced contact pressure between the bare wires 11, and the cord 21 with cushioning properties in the central portion supports the cable by force from the central portion of the cable toward the outer circumference of the cable in the radiating direction. This significantly improves cable durability in twisting operation performed by a welding robot or the like, for example, thereby enabling a reduction in the occurrence of cable breakage.

Further, due to the configuration of the bare wires 11 (child stranded wires) that are not isolated from each other by an insulation member or tape, joining at terminal portions can be easily carried out, and high processability can be obtained. This facilitates handling and enables a reduction in manufacturing cost compared to the conventional technology that requires peeling of coated wires of a plurality of child stranded wires constituting the cable for joining at terminal portions.

Second Embodiment

As in the first embodiment, a cable 10 according to a second embodiment includes a conductor section 1, the conductor section 1, and a reinforcement section 2, and as illustrated in FIG. 7, a gap 13 is formed in a region formed between the adjacent conductor sections 1 and an insulating covering member 3.

The gap 13 preferably occupies at least a part of the region formed between the adjacent conductor sections 1 and the insulating covering member 3. More preferably, the gap 13 occupies the entire region.

Since the gap 13 is formed in the region formed between the adjacent conductor sections 1 and the insulating covering member 3 as described above, the gap 13 acts as a cushion when the cable is used with repeated operations, such as twisting operations in a welding robot or the like, thereby enabling a significant improvement in cable durability and a reduction in the occurrence of breakage. In addition, this eliminates the need for a cutting process of a member in the region during cable manufacturing, thus allowing for an improvement in processability and a reduction in manufacturing cost.

To further clarify the features of the present invention, examples are shown below, but the present invention is not limited by these examples.

Example 1

(1) Preparation of Cable

According to the first embodiment described above, a cable according to Example 1 was produced using the following members.

<Member>

- Core wire 12: tin-plated soft copper wire (composite stranded conductor) (each cable cross-sectional area of 2 sq mm×10)
- Cord 21: polyester (intervention with high cushioning properties)
- Holding tape 31: fluorine tape
- Insulating member 32: polyester elastomer
- Sheath 33: PVC
- Outer diameter of conductor section 1: 9.2 (theoretical calculation ratio)

(2) Verification of Number of Core Wires

The outer diameter of the cable varies depending on the number of core wires 12 (the number of core wires) constituting the cable. FIG. 8 illustrates the result of calculating the outer diameter of a 22 sq mm conductor in the case of dividing the conductor into 1 to 12 (the case of the number of core wires being 1 to 12).

While the number of core wires is preferably 6 to 15 as described above, it was further confirmed from the measurement results illustrated in FIG. 8 that the number of core wires is more preferably 8 to 12 from the viewpoint of reducing the outer diameter of the cable. As a result, it was confirmed that the outer diameter of the cable can be reduced, and a highly durable cable can be realized in a compact form.

Example 2

A twisting durability comparison test was conducted between the cable produced in Example 1 and a conventional cable HMVV(c10681)AWG4(22)/1C (manufactured by DYDEN CORPORATION). As illustrated in FIG. 9(*a*), test conditions are as follows: a distance L between the fixed end and the working end of the target cable was 200 mm, a twisting angle θ was ±180°, and twisting repetitions were 5 million.

The obtained results are illustrated in FIG. 9(*b*). From these results, it was confirmed that the conventional cable had a conductor strand (bare wire 11) breakage of 36.7%. On the other hand, it was confirmed that the cable of the present example has almost no breakage, a conductor strand (bare wire 11) breakage of 0.21%. Accordingly, the difference in durability from the conventional product was remarkable, and extremely high durability was confirmed.

FIG. 10 illustrates the result of the appearance (conductor appearance) of each cable in the present twisting test. From the results obtained, no deformation of the conductor occurred in the cable of the present example while such deformation was confirmed after 5 million twisting repetitions in the cable of the conventional product. Hence the difference in durability from the conventional product was remarkable in appearance as well, and extremely high durability was confirmed.

REFERENCE SIGNS LIST

1 conductor section
11 bare wire
12 core wire
13 gap
2 reinforcement section
21 cord
21*a* filament
3 insulating covering member
31 holding tape
32 insulating member
33 sheath

The invention claimed is:

1. A cable formed by covering a conductor section, in which a conductor is spirally disposed in a longitudinal direction, with an insulating covering member that has an insulating property, the cable comprising:

a conductor section formed by stranding a plurality of bare wires to form a core wire and arranging a plurality of the core wires closely in contact in an annular shape; and a reinforcement section including a cord that includes a plurality of filaments of a fiber material, and formed by compressing and housing the cord substantially linearly within a central space formed by the core wires in the annular shape in the conductor section, wherein a cross-sectional area of the cord in a natural placement is formed to be bulkier than a cross-sectional area of the central space, and the cord is press-fitted into the central space.

2. The cable according to claim 1, wherein the cord is made of synthetic fiber.

3. The cable according to claim 1, wherein the reinforcement section houses the cord having fewer spiral rounds within the central space than spiral rounds of the conductor section.

4. The cable according to claim 1, wherein the core wires are linearly and closely in contact with each other at a plurality of points.

5. The cable according to claim 1, wherein a diameter of the conductor section is 3 to 6 times a diameter of the core wire.

6. The cable according to claim 1, wherein a diameter of the core wire is 8 to 60 times a diameter of each of the bare wires.

7. The cable according to claim 1, wherein a gap is formed in a region formed between the conductor sections adjacent to each other and the insulating covering member.

8. The cable according to claim 1, wherein the conductor section includes 6 to 15 of the core wires.

* * * * *